United States Patent [19]

Schertler

[11] Patent Number: 4,461,665
[45] Date of Patent: Jul. 24, 1984

[54] SHEET TYPE COMPOSITE MATERIAL AND METHOD AND APPARATUS FOR MANUFACTURING THE SAME

[76] Inventor: Manfred K. Schertler, Eulatalstrasse 31, 8858 Neuburg, Fed. Rep. of Germany

[21] Appl. No.: 394,494

[22] Filed: Jul. 2, 1982

[30] Foreign Application Priority Data

Jul. 8, 1981 [DE] Fed. Rep. of Germany ....... 3126948
Apr. 21, 1982 [DE] Fed. Rep. of Germany ....... 3214821

[51] Int. Cl.³ .................... B32B 31/04; B32B 31/14; B32B 3/28
[52] U.S. Cl. .................... 156/210; 156/269; 156/292; 156/322; 156/324; 156/330.9; 428/182
[58] Field of Search ............... 428/182, 184, 185, 186, 428/595, 603, 604; 156/210, 463, 269, 292, 311, 322, 324, 330.9

[56] References Cited

U.S. PATENT DOCUMENTS

| | | | |
|---|---|---|---|
| 2,091,918 | 8/1937 | Finck | 428/182 |
| 2,221,309 | 11/1940 | Gazelle | 428/184 |
| 3,037,592 | 6/1962 | Shipley et al. | 428/603 |
| 3,217,845 | 11/1965 | Reynolds et al. | 428/604 |
| 4,025,462 | 5/1977 | Cleveland | 428/182 |

FOREIGN PATENT DOCUMENTS 1117814  5/1956  France .................... 428/185

*Primary Examiner*—Paul J. Thibodeau
*Attorney, Agent, or Firm*—McCormick, Paulding & Huber

[57] ABSTRACT

The invention concerns a sheet like composite material which consists of a uniformly corrugated web and at least one flat web connected to it by welding, soldering or gluing wherein at least one of the webs is made of metal, and a method and apparatus for continuous manufacture of said composite material.

7 Claims, 7 Drawing Figures

Fig.3
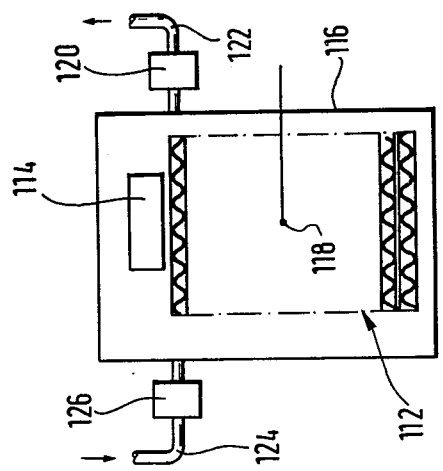
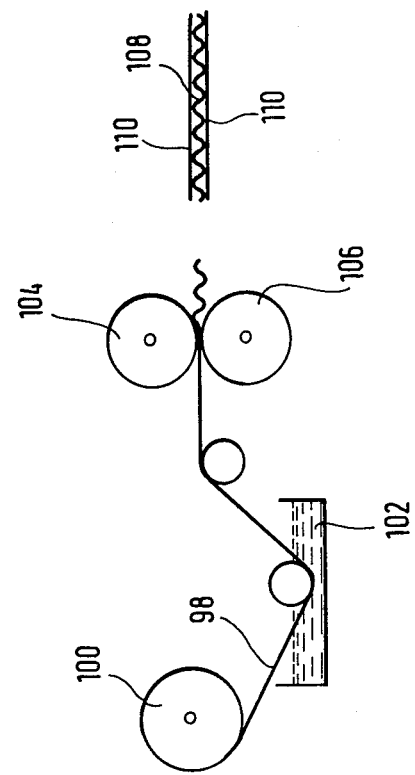

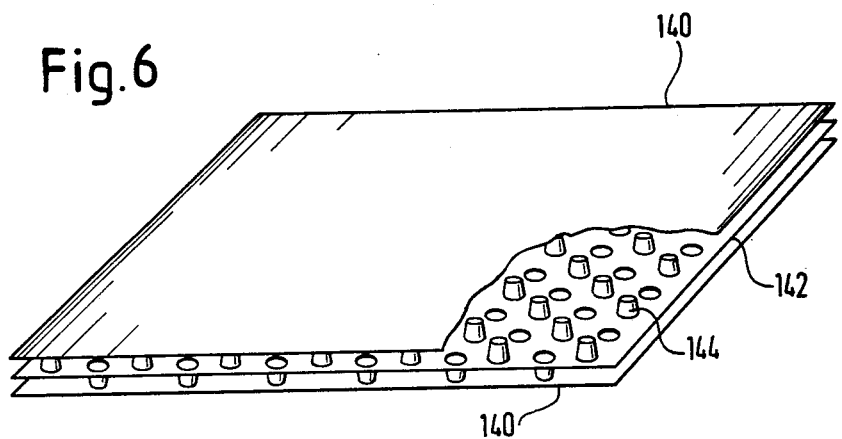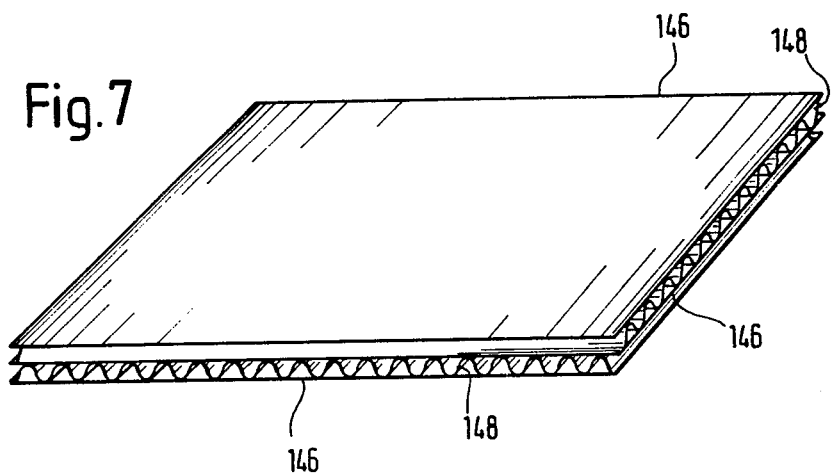

SHEET TYPE COMPOSITE MATERIAL AND METHOD AND APPARATUS FOR MANUFACTURING THE SAME

The invention concerns a sheet type composite material, as well as a method and an apparatus for manufacturing such composite material, that consists of at least one profiled material web and at least one flat material web which webs are connected to one another in the vicinity of their coengaging surface portions.

A composite material of this kind in which the profiled web is corrugated and the webs consist of paper has been known for a long time as corrugated cardboard. The strength of such corrugated cardboard is however relatively limited. For example, if a piece of corrugated cardboard of a few millimeters gauge is loaded with a compressive force acting in its plane the piece will buckle under a relatively small force. Therefore, corrugated cardboard, at least that of relatively small wall thickness, is used primarily for packing and decoration purposes, and not for the manufacture of constructions which are exposed to relatively high forces. Moreover, corrugated cardboard is sensitive to dampness and is combustible, to name only two disadvantages, which forclose its use for many construction purposes.

The object of the invention is to provide a composite material of the foregoing kind that possesses a high mechanical strength and a good resistance to weather with a small raw material requirement and a low weight.

This object is achieved in accordance with the invention by at least one of the material webs being made of metal. Even a composite material in which only one of the material webs is made of metal while the other web is or the other webs are made of paper possesses a considerably higher strength and weather resistance in comparison to customary corrugated cardboard that it can be used for many purposes where corrugated cardboard is not usable.

Preferably all of the material webs consists of metal. The profiled material webs can be uniformly corrugated or provided with a nubby profile on both sides. In the following description a corrugated metal web is referred to, however the invention is not limited to such a web. The material webs can be glued to one another or, so far as the material webs all consist of metal, can also be connected to one another by welding or soldering.

The composite material made of metal webs possesses a strength which is comparable with that of metal sheets of relatively larger gauge. Therefore, to produce a composite material having a similar strength with respect to mechanical stress the metal webs used in the manufacture are required to have only a very small gauge thereby requiring an essentially smaller quantity of raw material and therefore also achieving an essentially lower weight in comparison to a massive sheet of similar size or strength. If the corrugated web is connected only at one side with one flat web a material is produced that exhibits a high strength under loading in the longitudinal direction of the corrugations but which however is easily formed about an axis running parallel to the longitudinal direction of the corrugations.

The material of the invention can be made in a continuous manner whereby one sheet metal web is pulled from a first supply roll and corrugated between two interengaging profiled rolls and whereby at least one flat sheet metal web is pulled from a second supply roll and is continually conducted into engagement and connected with the corrugated sheet metal web.

In the case of a glued connection between the sheet metal webs it is advantageous to burn off the faces to be glued to one another before the gluing step, preferably through the use of a gas flame, in order to remove residual oil from the rolls and to prepare the gluing surfaces for the applied glue. Especially in the case of using a hot melt material as the glue a better adhesion of the glue to the sheet metal webs is achieved in this manner. Subsequent to the burning off step the sheet metal webs are brushed with rotating metal brushes shifting in the axial direction in order to clean the sheet metal webs of residue from the burning off process and to roughen the surfaces of the webs to obtain a better adhesion of the glue.

In the case of using a hot melt material as the glue the corrugated sheet metal web is preferably profiled by means of heated profiling rolls. The application of the glue advantageously follows in such a way that the previously melted glue is applied in the form of a film to oppositely running driven heated gluing rolls by means of an elongated slot nozzle, one of which gluing rolls is brought into engagement with the corrugated sheet metal web. The gluing rolls are heated, according to the type of hot melt material used, to about 180° to 260° C. The wave crests of the corrugated sheet metal web take from the continuous film on the gluing roll only about twenty percent of the glue. The removed glue is constantly replenished by means of the elongated slot nozzle and the flow through the nozzle is so controlled that only the removed glue is made up for to thereby inhibit charring of the hot melt material on the gluing rolls.

In order to make certain that a uniform thin supply of glue results only on the crests of the corrugations of the sheet metal the gluing rolls are brought into engagement with a portion of the corrugated sheet metal web which is still in engagement with one of the profiling rolls. Thus the corrugated sheet metal web is held in a definite position relative to the gluing roll.

The flat sheet metal web is preferably preheated, pressed against the corrugated sheet metal web provided with glue and subsequently cooled in such a manner that the pressing together and the cooling occurs over a section of the corrugated sheet metal web which is still received on one of the profiling rolls. For one thing, in proceeding in this manner a backup roll can be used for pressing the flat sheet metal web to the corrugated sheet metal web without, even at high pressing pressures, either deforming or distorting the corrugated sheet metal web. For another thing, through this preferred sudden cooling of the flat or smooth sheet metal web before the loosening of the corrugated web from the profiling or riffling roll it is assured that the hot melt material is hardened to such a degree that a secure adhesion is obtained which prevents the two sheet metal webs from being displaced from one another as the corrugated sheet metal web is pulled from the profiling roll.

The cooling of the flat sheet metal web takes place preferably by means of a cooled contact roll rolling on the free surface of that web. Because of the insulating air cushions in the canals enclosed by the corrugations and the low heat conduction in the corrugated sheet metal web itself the temperature of the corrugated sheet metal web remains high enough in the vicinity of its free wave crests that they can still be connected to another flat sheet metal web through the use of a hot melt material. This takes place for example in such a way that the composite material consisting of the corrugated sheet metal web and one flat sheet metal web is continually moved over a flat supporting surface, that after the application of glue to the free wave crests of the corrugated sheet metal web, for example in the above described manner, a second heated sheet metal web is continually moved to the composite material and pressed against it, and that the composite material consisting of the three sheet metal webs is then cooled. The cooling can be accomplished in such a manner that on one side of the resulting material web air is withdrawn from the canals formed by the corrugated sheet metal web and on the other side of the material web cold air is blown into the canals. The resulting composite material can then be divided into plates and stacked.

If the corrugated sheet metal web is connected to only one flat sheet metal web the resulting material can be rolled up on a roll. In this case the material taken from the profiling roll can be additionally cooled to achieve a quicker hardening of the hot melt material.

Preferably the material webs are glued to one another using a polyamide glue material which effects a very permanent connection between the material webs with a small quantity of glue.

The glue material may be applied in a very simple manner by means of a polyamide foil which is inserted between the material webs and heated to the melting temperature of the polyamide material. Of course, this method of application uses more polyamide material than is really necessary since the flat material web and the corrugated material web only engage one another over small portions of their surfaces.

An essentially smaller usage of polyamide glue may be achieved by extruding the polyamide glue near the location past which the two material webs are driven and by having the glue wiped onto the wave crests of the corrugated material web from a lip extending along the extruder opening. The speed of extrusion from the extruder is so regulated that each time a wave crest moves past the lip of the extruder opening exactly the amount of glue is wiped from the lip as is necessary for the gluing of the material webs together along the wave crest.

The previously described type of gluing is particularly well suited for a composite material that consists of at least one metal web and one or more webs of paper. Thereby, for example, a composite material like a kind of corrugated cardboard can be manufactured in which at least one of the outer flat material webs consists of a thin metallic foil. This results in a material which is relatively moisture-resistant in comparison to customary cardboard.

The use of a polyamide foil offers also the possibility to make an initial material which then can be used for manufacturing objects of different forms. The initial material consists of a corrugated material web and a flat material web glued to the corrugated web wherein the free side of the corrugated web is coated with a polyamide foil. This material for example, can be wrapped around a thin walled tube with the polyamide foil carrying side of the corrugated material web adjacent the tube and can be glued to the tube by heating so that in this way a tube formed of composite material can be produced.

The sheet metal webs can also be connected to one another through the use of a two component glue, for example an epoxy glue or a phenol glue. In this case the sheet metal webs are also burned off and brushed in the above described way. The glue application takes place in such way that the flat sheet metal web is preheated and provided with a film of hardener and that subsequently the second glue component is applied slightly warmed by means of a glue applying apparatus of the above described kind. Heat assisted this second glue component reacts immediately with the hardener film and brings about sufficient initial adhesion to hold the sheet material webs to one another. The corrugated sheet metal web in this process is profiled in the same manner as described above. In place of the above described cooling roll a heated roll is used to inhibit the cooling of the sheet metal webs and to accelerate the hardening of the glue material.

In the case of manufacturing a three layered composite material the third material web is made available in the same way as just described and is guided to a composite material web driven over a flat supporting surface.

The cut plates are driven between heating devices, for example infrared heaters, and heated from above and below to about 260° C. Thereafter they are stored in an insulated chamber until entirely hardened. Because of the good insulating properties of the air enclosed in the profiles the cooling of the stack proceeds only very slowly.

In order to obtain a composite material that is resistant to both high temperature and to the effects of chemical substances it is advantageous that the sheet metal webs are soldered to one another. This can for example be achieved in such way that the sheet metal web to be profiled and/or the flat sheet metal web is coated with solder on the face which is to engage the other web, that after the profiling and the cutting to length of the profiled sheet metal web a piece of the same as well as at least one piece of one flat sheet metal web are laid upon one another, and that the so laid up web pieces are then heated in a high vacuum to the melting temperature of the solder and subsequently cooled. Preferably the cooling is achieved through the use of a cold protective gas. For economy in working, the sheet metal pieces to be connected to one another are advantageously stacked in a plurality of layups upon one another so that the entire stack can be heated in an evacuatable container or room by means of radiation heat. The temperature can be supervised by a temperature sensor inserted into the center of the stack.

The sheet metal webs can also be connected to one another by welding. Preferably the welding is achieved by means of an electron beam welder. Such a method allows a continuous processing of the inventive composite material. Preferably the corrugated sheet metal web is so welded with the first flat sheet metal web that the electron beam engages the corrugated sheet metal web in its wave troughs or valleys. Thereby welding can be accomplished without producing visible welding tracks on the outer side of the flat sheet metal web. In the welding of the second flat sheet metal web these welding tracks cannot be avoid- ed.

The sheet metal webs can also be welded to one another in other ways, for example through projection welding or through the use of a laser beam.

A device for manufacturing the inventive composite material through electron beam welding includes, in accordance with the invention, a high vacuum chamber with an input opening for the sheet metal webs to be connected to one another and an outlet opening for the composite material, an input and an output lock, profiling rolls arranged in the high vacuum chamber for profiling the corrugated sheet metal web as well as guide rolls for guiding together the sheet metal webs to be joined and at least one electron beam welding device the electron beam of which is preferably controlled in accordance with the continuous speed of the material webs so that it is not only deflectable along the length of the corrugations but is also deflectable transversely of the corrugations. The locks are advantageously divided into several chambers so that the vacuum is increased stepwise from chamber to chamber. Also, an individual input lock can be provided for each of the sheet metal webs.

In order to avoid the sealing problems associated with locks, the supply rolls for the metal webs can also be located inside of the high vacuum chamber. The high vacuum chamber must further be equipped with a shield against the x-rays emitted during the electron welding.

Further features and advantages of the invention will be apparent from the following description which in association with the accompanying figures explain the invention by means of exemplary embodiments.

FIG. 3 is a schematic representation of the steps in a process for soldering the sheet metal webs.

FIG. 6 is a perspective view of a section of composite material using a material web provided with a nubby profile.

FIG. 7 is a perspective view of a composite material using two corrugated material webs.

Figure 1:
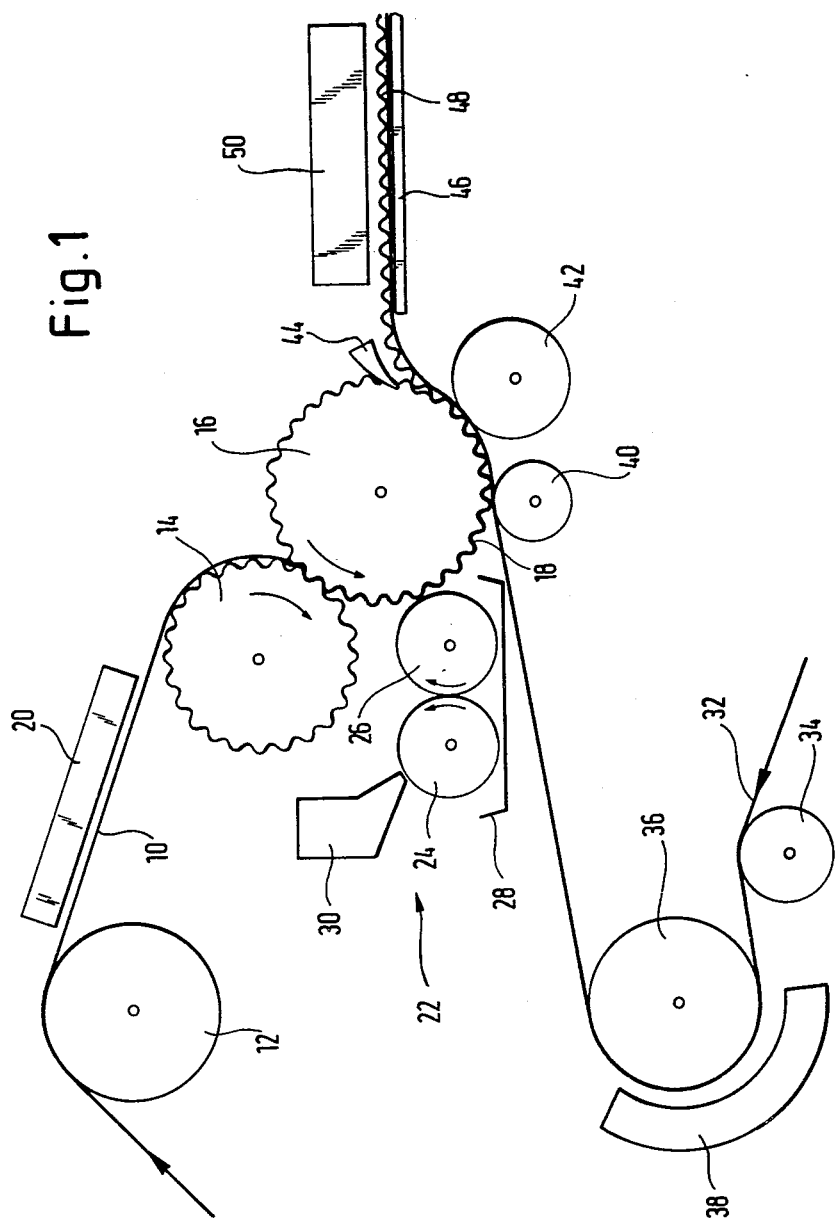
FIG. 1 is a schematic side view of an apparatus for manufacturing a composite material by gluing together a corrugated sheet metal web and a flat sheet metal web.

Referring to the apparatus shown in FIG. 1, a first sheet metal web 10 is pulled from a supply roll (not shown) over a training roller 12 and fed to the nip of two profiling rolls 14 and 16 which have corrugated profiles with uniform waves which extend parallel to their axes and which engage one another like gears. By its passage through the nip of the rolls the sheet metal web 10 receives a corresponding corrugated profile with wave crests running perpendicular to its longitudinal direction.

The profiling or fluting rolls 14 and 16 as well as the training roll 12 may be heatable ones. Additionally or alternatively thereto a heating apparatus 20 is provided before the profiling roll 14 to heat the sheet metal web 10 by means of heated air or infrared rays.

By means of a gluing apparatus indicated generally at 22 a hot melt material is applied to wave crests of the profiled sheet metal web 10 which still lie on the profiling roll 16. The glue application apparatus includes two heated gluing rolls 24 and 26 which rotate above a glue collecting container 28. A thin film of premelted hot melt material is applied to the gluing roll 24 by means of an elongated slot nozzle 30. The hot melt mass is transmitted from the gluing roll 24 to the gluing roll 26 on which a thinner film of glue is formed. The wave crests of the profiled metal web 10 which tangentially come into engagement with the gluing roll 26 take off about twenty percent of the glue film so that a small line of glue remains on the wave crests of the sheet metal web. The glue which is used in this manner is supplemented by the elongated slot nozzle. By a controller for the elongated slot nozzle flow through it is controlled so that the flow is only as much as actually required in order to avoid the accumulation and charring of glue material on the heated glue rolls 24 and 26.

A second sheet metal web 32 is pulled from another supply roll (not shown) over training rolls 34 and 36. The training rolls and 34 and 36 may be heated if desired. Alternatively or additionally a heating apparatus 38 is provided and arranged coaxial to the training roll 36. The sheet metal web 32 after leaving the training roll 36 is pressed against a portion of the corrugated sheet metal web 10 which still lies in the profiling roll 16 by means of a pressure roll 40. Behind the pressure roll 40, in the transport direction, is a cooling roll 42 which engages the outer side of the flat sheet metal web 32 and cools it off in a sudden or shock-like manner, so that the hot melt material at the glue locations between the flat sheet metal web and the wave crests of the corrugated sheet metal web are hardened to such an extent that the two sheet metal webs 10 and 32 which are connected to one another are adequately firmly adhered to one another. The connected sheet metal webs can now be pulled from the profiling roll 16 by means of the schematically represented finger 44 and pulled onto a table or another flat supporting surface 46. Here the resulting composite material 48 is entirely cooled by means of a cooling apparatus 50 which may be of a type including a means such as a heat pump enabling the removed heat to be used again for heating the sheet metal webs 10 and 32.

The resulting composite material web can be bent about an axis running perpendicular to its longitudinal direction and therefore can be rolled up onto a roll. However, if a composite material is to be made in which the corrugated sheet metal web has flat sheet metal webs on both of its sides the cooling apparatus 50 is omitted. Instead of this at its place a further glue application apparatus is arranged in order to apply glue to the still warm corrugated sheet metal web. Further, a third sheet metal web is conducted to the corrugated sheet metal web and by means of a pressure roll (not shown) is pressed against the composite material 48 on the table 46. The cooling of the resulting three-layer composite material then takes place by blowing cool air through the hollow spaces or canals inside the composite material. Here also the removed heat can be used again.

Figure 2:
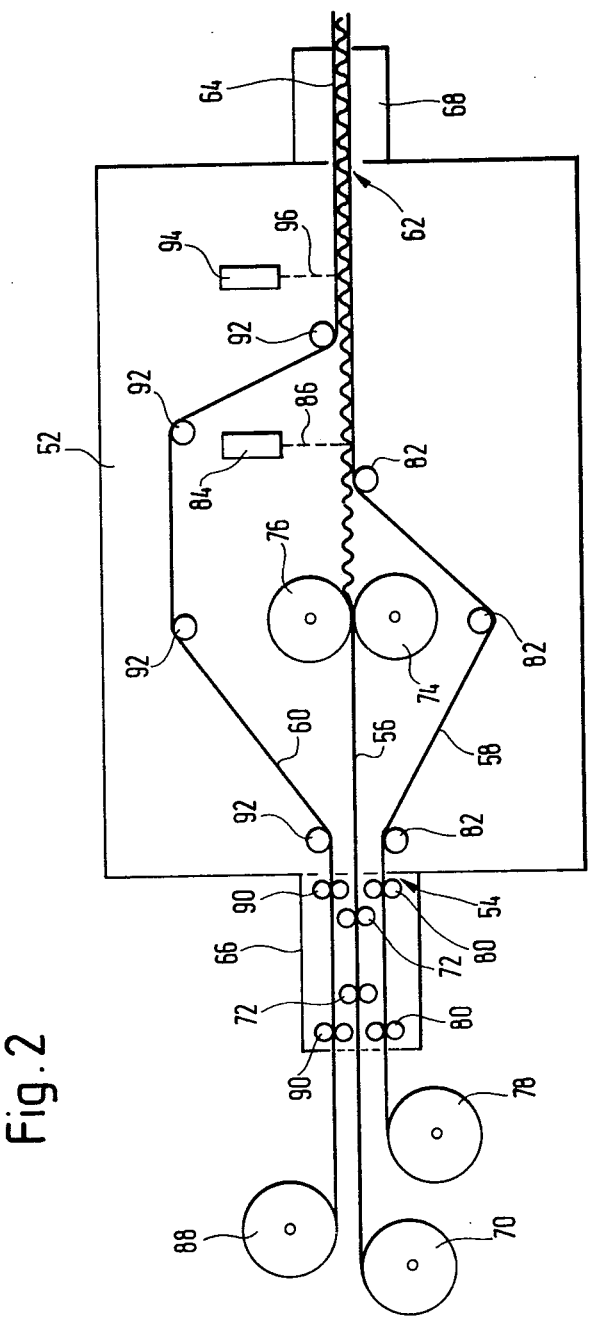
FIG. 2 is a schematic representation of a device for manufacturing a composite material of three sheet metal webs, which are connected to one another by electron beam welding.

FIG. 2 shows in a schematic way an apparatus for manufacturing a three-layer composite material wherein the three sheet metal webs are connected to one another by electron beam welding. The device includes a high vacuum chamber 52 with an entrance 54 for the input of three sheet metal webs 56, 58 and 60 and with an outlet 62 for the exit of the finished composite material 64. At the entrance and the outlet of the high vacuum chamber 52 are vacuum locks 66 and 68, respectively.

The middle sheet metal web 56 is pulled from a supply roll 70 over guide rolls 72 into the vacuum lock 66 and lead to profiling rolls 74 and 76 which are profiled in the same way as the profiling rolls 14 and 16 of FIG. 1 and give the sheet metal web 56 a corrugated profile.

The bottom sheet metal web 58 is pulled from a supply roll 78 and by means of the guide rolls 80 in the vacuum lock 66 as well as the guide rolls 82 in the high vacuum chamber 52 are driven into engagement with the undersurface of the corrugated sheet metal web 56. An electron beam welding apparatus 84 is arranged above the corrugated sheet metal web 56 and welds the sheet metal web 56 and the sheet metal web 58 to one another, the electron beam 86 being so controlled that the resulting weld joint runs along one of the valleys of the sheet metal web 56. In this way no welding tracks appear on the free outer surface of the sheet metal web 58.

The third sheet metal web 60 is driven from a supply roll 88 over guide rolls 90 in the vacuum lock 66 and guide rolls 92 in the high vacuum chamber 58 to the corrugated sheet metal web 56 at a point behind the electron beam welding machine 84 in the transport direction, and from above this machine, and is welded to the corrugated sheet metal web by means of another electron beam welding apparatus 94. The electron beam 96 is so controlled from above the sheet metal web that the sheet metal web 60 and the corrugated sheet metal web 56 are welded to one another along the lengths of the crests of the corrugations. The resulting composite material made of the three sheet metal webs welded to one another leaves the apparatus through the outlet 62 and the outlet lock 68. Thereafter it can for example be cut into plates of desired size with the help of metal saws or the like.

The locks 66 and 68 are represented only as simple blocks. In practice, these locks in general as a rule are divided into several chambers successively connected to one another in which a gradual transition from atmospheric pressure to the pressure of the chamber 52 is obtained.

Instead of only one input lock 66 there can also be one input lock for each of the sheet metal webs. Further, the supply rolls 70, 78 and 88 could be arranged inside the high vacuum chamber 52 to avoid the problems of introducing the material into the high vacuum chamber 52 by means of locks.

FIG. 3 shows in schematic form the manufacture of composite material plates in which the sheet metal pieces are soldered to one another. The sheet metal web 98, which becomes the profiled middle web, is pulled from a supply roll 100 and subsequently runs through a solder bath 102 in which it is provided with a solder coat on both of its sides. Thereafter the web 98 is profiled between profiling rolls 104 and 106 and cut to length. A piece 108 of the profiled sheet metal web and two flat sheet metal web pieces 110 are laid upon one another as shown and are stacked with similar layups each also made of three sheet metal pieces. The stack 112 so made is loaded with a weight 114 and heated in a pressure chamber 116 under high vacuum by means of a heat radiation source (not shown) to the melting temperature of the solder. The temperature can be supervised by a temperature sensor 118 located in the center of the stack 112. The creation of the vacuum in the pressure chamber 116 is achieved by means of a vacuum pump (not shown), connected to a pipe 122 which can be shut off by a valve 120. Upon the melting of the solder the three sheet metal pieces of each layup become joined together, whereupon a cool protective gas is introduced into the pressure chamber 116 through a further pipe 124, which may be shut off through a valve 126, to cool off the sheet metal webs and the solder. Thereafter the finished composite material plates may be taken from the pressure chamber. In this way composite material plates with for example a length of twelve meters and a width of 1.3 meters can be manufactured quickly and easily.

A multitude of applications can be offered for the material manufactured in the previously described way. In automobile construction the material of the invention allows a substantial saving of material and weight to be achieved without, as for example in the case of using plastic, compromising strength and/or safety.

In the manufacture of pipes or ducts for ventilation and air conditioning equipment or installations it becomes for example possible to cut the material on site and to fabricate the pipes and ducts at the construction site whereas previously the pipe and duct sections had to be preworked in a workshop because the sheet metal previously used had to be formed to give the pipe or duct parts necessary rigidity. Moreover, the material of the invention has a high heat insulation effect because of the air entrapped in the corrugation canals.

Figure 4:
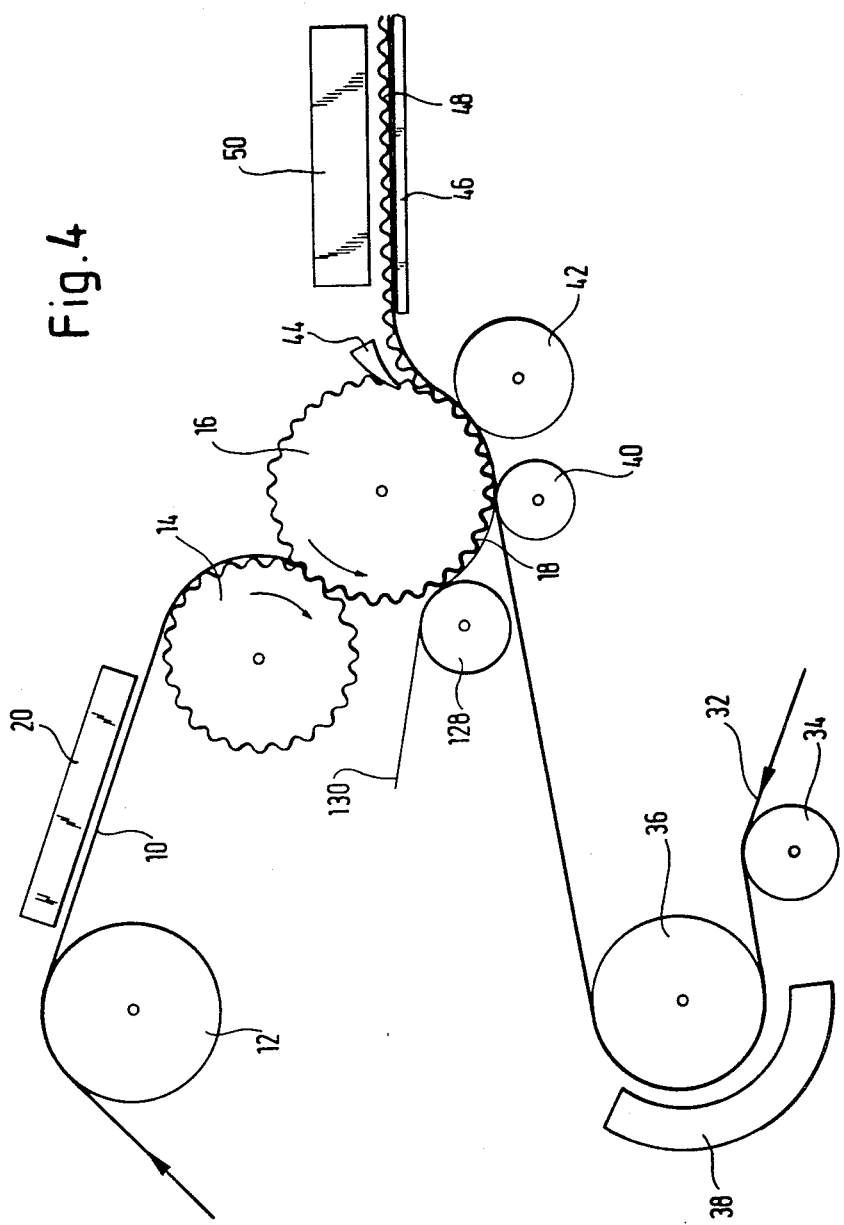
FIG. 4 is a view similar to FIG. 1 but showing gluing by means of a polyamide foil.

The apparatus shown in FIG. 4 differs from that of FIG. 1 only with regard to the apparatus for applying the glue material. Therefore, similar parts have been given similar reference numbers and are not explained again.

Instead of the glue applying apparatus generally indicated at 22 a single roll 128 is provided which guides a polyamide foil 130 from a supply roll (not shown) into place between the corrugated web 18 and the flat web 32. The polyamide material may be a copolyamide with a working temperature of about 260.

Figure 5:
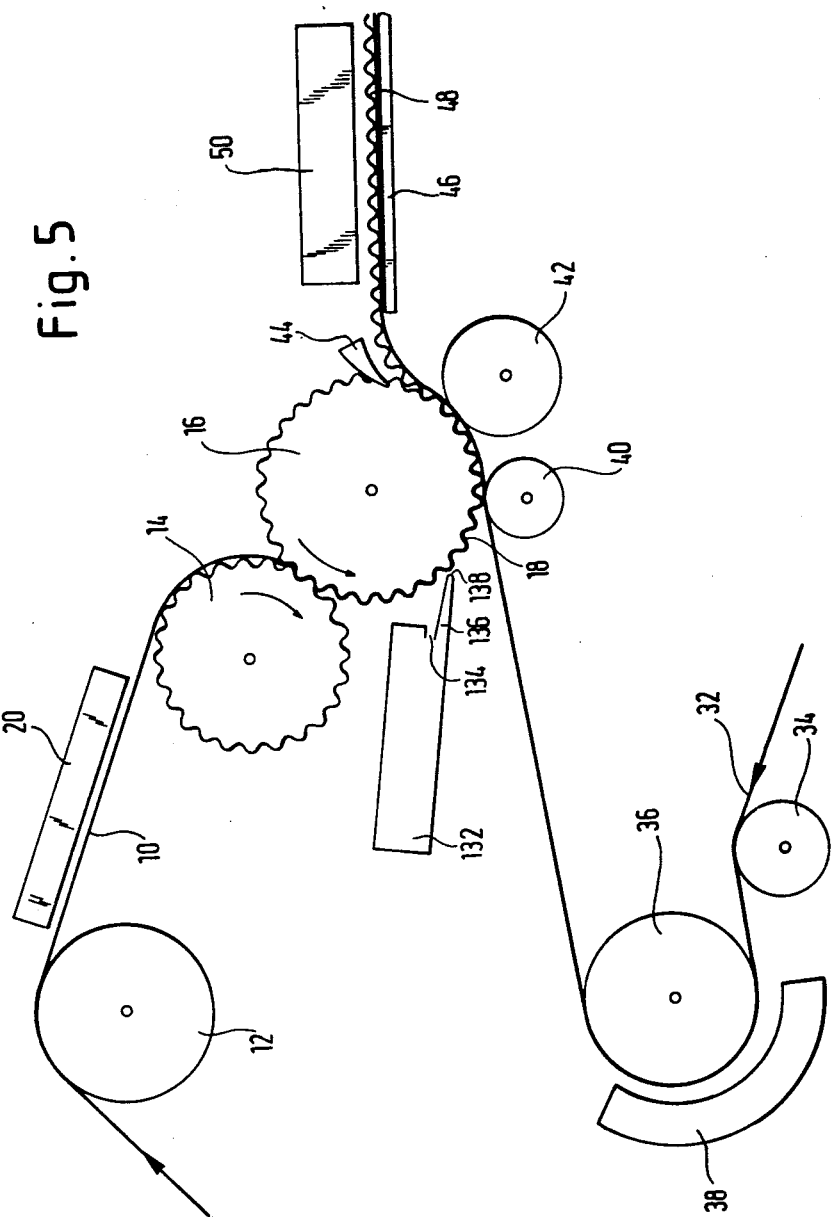
FIG. 5 is a view similar to FIG. 1 but showing gluing by means of an extruded polyamide material.

In FIG. 5 the parts which are the same as ones in FIG. 1 have been given the same reference numbers and are not further explained. Instead of the glue applying apparatus 22 according to FIG. 1 an extruder 132 (shown only schematically) is provided, through the extrusion slot 134 of which the polyamide glue material is extruded. The extruder 132 has a lip 136 over which the extruded glue flows. The gap between the forward edge 138 of the lip and the wave crests of the material web 18 is of such size that the wave crests which move past the forward edge 138 of the lip 136 wipe the flowing material from the lip. The gap measures about 1/10 mm. The speed of extrusion of material from the extruder is controlled in dependence on the speed of the corrugated material web 18 running past the lip 136 so that for each wave crest only so much material flows over the lip 136 as is necessary to reliably glue the corrugated web 18 along the wave crest to the flat web 32. It is also to be emphasized that the extruder 132 naturally could also be arranged vertically to facilitate the flow of the extruded material over the free edge of the lip 136.

FIG. 6 shows in a perspective schematic view a section of a composite material consisting of two flat material webs 140 and an intermediate profiled web 142, wherein the profiled web 142 has a nubby profile with nubs or bosses 144 on both of its sides. The nubs naturally can have any desired shape different from the illustrated one.

FIG. 7 shows finally in a perspective section a composite material suited to high loads which consists of three thin material webs 146 and two corrugated material webs 148, each of which corrugated webs is arranged between two of the webs 146 so that their wave directions are arranged perpendicular to one another. According to the required rigidity more than two overlying corrugated material webs can be used, in which case the wave directions of neighboring corrugated material webs cross one another. Also it is possible to lay the corrugated material webs 148 directly on one another without an intermediate flat material web 146 and to connect the corrugated material webs directly to one another.

The composite material of the invention with a total thickness of only a few millimeters and a low weight exhibits an exceptionally high strength and load bearing ability.

I claim:

1. A process for making a sheet type composite material characterized by the steps of pulling a first sheet metal web from a first supply roll and profiling it between two interengaging profiling rolls at least one of which is heated, pulling a second flat sheet metal web from a second supply roll and continuously guiding it into contact with the profiled sheet metal web, gluing said two webs to one another while they are continuously brought into contact with one another by means of a hot melt material serving as a glue material, heating said first web in advance of its reaching said profiling rolls, heating said second sheet metal web in advance of its being brought into contact with said profiled web, applying said glue to said profiled web prior to said first and second webs being brought into contact with one another, said step of binging said first and second webs into contact with one another being performed while the portion of the profiled web at which the contact takes place is still positioned on one of said profiling rolls, pressing said two sheet metal webs to one another as they are brought into contact with one another and thereafter cooling them off, said steps of pressing and cooling off being performed while the involved portion of said profiled sheet metal web is positioned on said one of said profiling rolls, after said steps of pressing and cooling said two sheet metal webs continuously driving the now joined pair of webs over a flat supporting surface, applying glue to the free profiled crests of the profiled web, continuously driving a third heated flat sheet metal web and bringing it into contact with said free profiled crests and pressing it against said now joined pair of webs, and then cooling the so-formed three layered layup and cutting it to size.

2. The process defined in claim 1 further characterized by said glue being a thermoplastic polyamide material.

3. The process defined in claim 1 further characterized by extruding said glue near the location at which said first and second sheet metal webs are brought together and wiping it from a lip extending along an extruder opening by the wave crests of said profiled web.

4. The process defined in claim 1 further characterized by applying said glue to oppositely running driven gluing rolls by means of an elongated nozzle in the form of a film, and bringing one of said gluing rolls into engagement with the wave crests of said profiled web near the location at which said two webs are brought together.

5. The process defined in claim 4 further characterized in that the glue applying roll engages a portion of the profiled web which is positioned on said one of said profiling rolls.

6. A process according to claim 1 further characterized in that the step of cooling off said first and second webs after their being brought into contact being accomplished by means of a cooled contact roll engaging the free surface of said first flat sheet metal web.

7. A process as defined in claim 1 further characterized in that the step of cooling off said three layered layup is achieved at least in part by conducting cooling air through the hollow spaces in such three layered layup.

* * * * *